United States Patent [19]

Alexander

[11] 4,452,112
[45] Jun. 5, 1984

[54] METHOD OF PARTING METALLIC RINGS

[75] Inventor: Jesse A. Alexander, Lewistown, Pa.

[73] Assignee: Titanium Metals Corporation of America, Pittsburgh, Pa.

[21] Appl. No.: 339,574

[22] Filed: Jan. 15, 1982

[51] Int. Cl.³ .............................................. B23B 1/00
[52] U.S. Cl. ........................................ 82/47; 82/1.2; 407/103; 407/117
[58] Field of Search .............. 407/101, 102, 103, 117; 82/1 C, 47, 1.2

[56] References Cited

U.S. PATENT DOCUMENTS

| | | | |
|---|---|---|---|
| 1,103,164 | 7/1914 | Turner | 407/117 |
| 2,289,544 | 7/1942 | Cedarleaf | 407/103 |
| 2,353,913 | 7/1944 | Luers | 407/117 |
| 4,035,889 | 7/1977 | McCreery | 407/117 |

FOREIGN PATENT DOCUMENTS

| | | | |
|---|---|---|---|
| 901785 | 6/1972 | Canada | 407/117 |
| 671005 | 4/1952 | United Kingdom | 407/103 |

*Primary Examiner*—W. D. Bray
*Attorney, Agent, or Firm*—John K. Williamson; James C. Valentine; John L. LaPierre

[57] ABSTRACT

A metallic ring rotating about a horizontal axis is parted by a cutting edge of a parting tool presented to the surface of the workpiece below its center of rotation. The parting tool is subjected to substantially constant high pressures which minimize chatter, vibration and shock. Vibrations generated during heavy duty operations are minimized by the additional step of supporting the toolholder with side plates.

6 Claims, 3 Drawing Figures

METHOD OF PARTING METALLIC RINGS

The invention relates to a method of parting metallic rings and to a new use for sintered carbide cutting tools.

Metallic rings are parted by a cutting edge applied to the surfaces of the rings while being rotating about a horizontal axis on a lathe. The cutting edges of the parting tools comprise carbide tips brazed onto blades releasably held by tool holders or directly onto the tool holders themselves. The brazed tips are subjected to a grinding step before they can be used for parting operations. The conventional practice in the art has long been to present the blade to the rotating surface of the rings in the horizontal plane of the center of rotation. Thus, it is stated in the 45th edition of a South Bend Lathe works manual entitled "How to Run a Lathe" at Volume I, page 28:

"CORRECT HEIGHT OF CUTTING EDGE

The cutting edge of the cutter bit should be about 5° above center, or 3/64 in. per inch in diameter of the work, as shown in FIG. 51 at right, for ordinary straight turning. The position of the cutter bit must be taken into consideration when grinding the various angles, as the height of the cutter bit determines the amount of front clearance necessary to permit free cutting.

The cutting edge of the cutter bit should always be place exactly on center, as shown in FIG. 52, for all types of taper turning and boring, and for cutting screw threads, also for turning brass, copper and other tenacious metals." Although the prior art parting methods are practicable, they also result in objectionable vibration, chatter or shock. Thus sintered carbides have not been useful in the prior art parting operations because the vibration, chatter and shock destroy the brittle sintered carbides.

The present invention is directed to a method of substantially reducing the vibration, chatter and shock associated with the parting of large metallic rings in accordance with the standard prior art practices. In contrast with the accepted practice of the art, the method of the present invention comprises the step of presenting the cutting edge of the parting tool to the workpiece below its center of rotation. The positioning of the cutting edge below the centerline effects a more negative back rake angle and generates substantially constant high forces on the cutting tools and thereby substantially reduces chatter, vibration and shock. The step of supporting the tool holder with side plates reduces the vibration and chatter even more. The substantially high constant forces exerted upon the cutting edges by the workpiece permits the use of indexable cutting tools of the type which are fastened to the toolholder only by a screw. Although the forces exerted upon the parting tool are significantly higher in the practice of the present invention, brittle sintered tungsten, tantalum, titanium or mixed carbide cutting tools can be used because the exerted forces are substantially constant.

Other details, objects and advantages of the invention will become apparent as the following preferred embodiment thereof proceeds. The preferred embodiment is shown in the accompanying drawings, in which.

Figure 1:
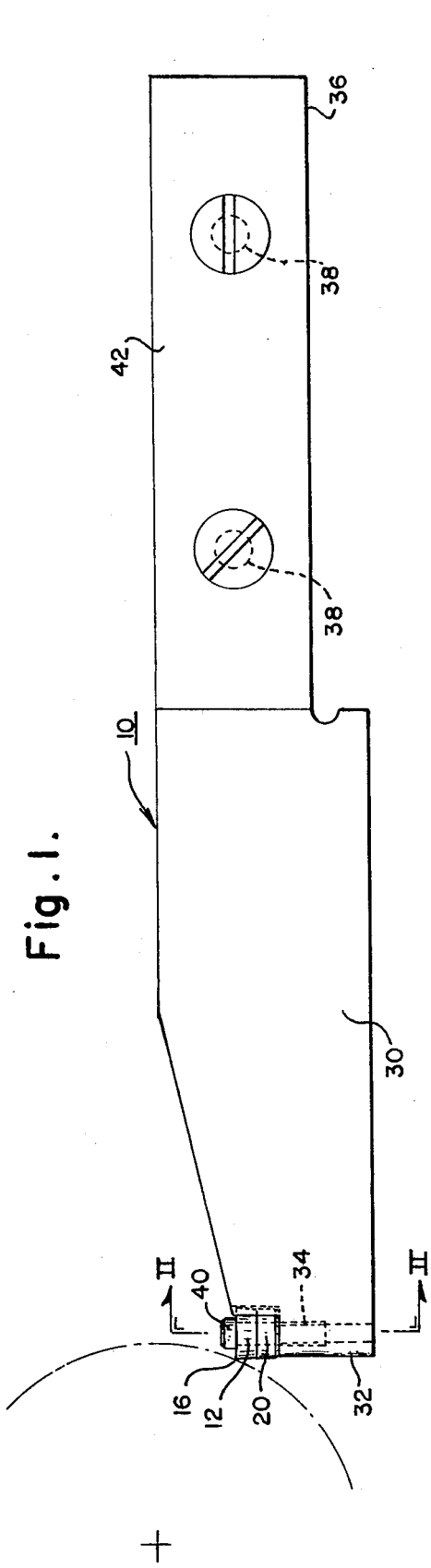
FIG. 1 is a side view of a parting tool assembly presented to a rotating workpiece shown in phantom.
Figure 3:
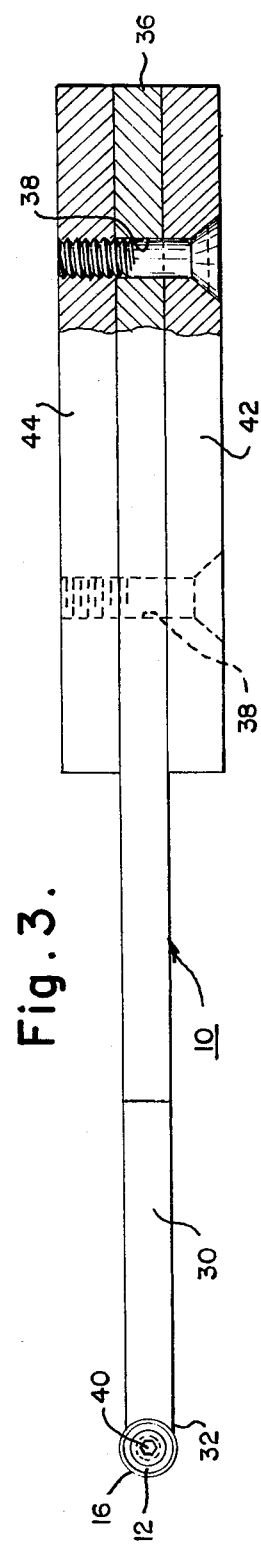
FIG. 3 is a top view of the support member depicted in FIG. 1.
Figure 2:
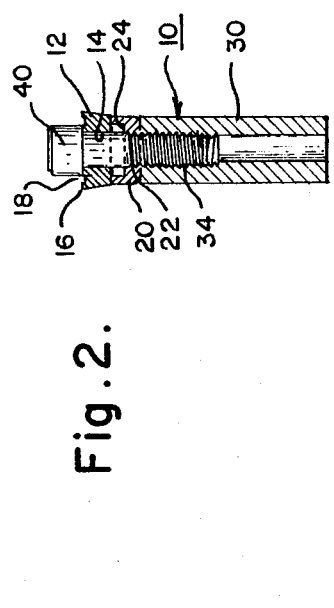
FIG. 2 is a section of the parting tool and seat taken along section line II—II of FIG. 1.

FIG. 1 generally shows a workpiece in phantom rotating about its horizontal axis and a parting tool assembly 10 engaging the surface of the workpiece below the horizontal plane of the center of rotation (indicated by the symbol "+").

The parting tool 12 comprises an indexable (and disposable) insert which has a bore 14 through its center for receiving a fastener 40 such as a screw. The tool 12 also has a cutting edge 16 for parting metal from the surface of the workpiece and a chip control surface configuration 18 for directing the parted metal away from the surface of the workpiece.

The parting tool 12 may be seated directly on a toolholder 30 but (as is shown) it is preferable to seat the parting tool 12 on a shim seat 20, which itself is seated upon toolholder 30. Shim seat 20 has a bore 22 for receiving fastner 40 and is indexable independently of the parting tool 12. Although the preferred practice is to seat the parting tool 12 on the shim seat 20, the shim seat 20 may have a large diameter base for receiving the lower portion of the parting tool 12. The parting tool 12 then seats upon an internal shoulder 24 within the bore 22.

The parting tool 12 and seat 20 are fastened upon the toolholder 30 by the screw 40. The toolholder 30 has a first end 32 with a drilled and tapped hole 34 in alignment with the bore of the parting tool 12 and the seat 20 for receiving the screw 40 which tightly engages the threads of the bore 34 to hold the parting tool and shim seat 20. The support member 30 has a second end 36 adapted to engage a tool post mounted on a carriage on the frame of the lathe (not shown) for presenting the cutting edge 16 of the parting tool 12 to the rotating workpiece. As is shown in the drawings, the second end 36 may have holes 38 for alignment with corresponding holes in an attachment of the tool piece adapted to receive a suitable fastening means. The toolholder 30 may have side plates 42 and 44 to support the toolholder 30 from vibrations due to the extremely high presures generated in the parting of very large rings.

The parting tool assembly 10 shown in the drawings was use to part large metallic rings. The specific nature of the parting tool 12, shim seat 20 and screw 40 were commercially designated as RCMM 43E, RS43P and GE-PL 46 respectively. The toolholder 30 and side plates 42 and 44 were fabricated from about one half inch thick 4140 steel having a Brinell Hardness of 265–321.

A grade 5160 (A.I.S.I. designation) ten inch thick steel ring having an inner diameter of 29.62 inches was parted in three parting cuts. The ring was rotated about its horizontal center at 38 RPM and a one-half inch diameter parting tool 12 was advanced toward the rotating surface of the ring at a feed rate of 0.010 inch/sec. The parting tool 12 engaged the surface of the rotating ring below the horizontal plane of the center of rotation and then advancing the parting tool toward the rotating ring to engage and part the ring. The ring was parted in three parting cuts; and in the first cut 4.88 inches were parted in thirteen minutes. There was little or no noise throughout the operation.

Although the invention has been shown and described with respect to a preferred embodiment thereof, it should be understood by those skilled in the art that various changes and omissions in the form and detail thereof may be made therein without departing from the spirit and scope of the invention.

What is claimed is:

1. A method of parting a metallic ring rotating about a horizontal axis comprising the steps of first presenting the cutting edge of the parting tool to the ring below its center of rotation and then advancing the parting tool toward the rotating ring to engage and part the ring.

2. The method of claim 1 wherein the parting tool is an indexable parting tool fastened to a toolholder by a screw.

3. The method of claim 2 wherein the cutting edge of the parting tool is a sintered carbide of tungsten, tantalum, titanium or mixtures thereof.

4. The method of claim 3 wherein the cutting edge of the parting tool encircles the screw.

5. The method of claim 4 wherein the parting tool is seated upon an indexable shim seat which is fastened to the toolholder by the screw.

6. The method of claim 2 including the step of supporting the toolholder from movement with at least one side plate attached to the toolholder.

* * * * *